(12) United States Patent
Jiang

(10) Patent No.: US 10,825,261 B2
(45) Date of Patent: Nov. 3, 2020

(54) METHOD AND DEVICE FOR DETERMINING AND ADJUSTING SPATIAL ATTRIBUTE OF VIRTUAL CHARACTER IN VIRTUAL REALITY APPLICATIONS

(71) Applicant: Tencent Technology (Shenzhen) Company Limited, Shenzhen (CN)

(72) Inventor: Jin Jiang, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 0 days.

(21) Appl. No.: 16/360,673

(22) Filed: Mar. 21, 2019

(65) Prior Publication Data

US 2019/0213800 A1    Jul. 11, 2019

Related U.S. Application Data

(63) Continuation of application No. PCT/CN2018/071749, filed on Jan. 8, 2018.

(30) Foreign Application Priority Data

Jan. 18, 2017   (CN) .................. 2017 1 00400648

(51) Int. Cl.
*G06T 19/20*    (2011.01)
*A63F 13/52*   (2014.01)
(Continued)

(52) U.S. Cl.
CPC ............ *G06T 19/20* (2013.01); *A63F 13/211* (2014.09); *A63F 13/212* (2014.09); *A63F 13/216* (2014.09); *A63F 13/22* (2014.09); *A63F 13/25* (2014.09); *A63F 13/428* (2014.09); *A63F 13/52* (2014.09); *A63F 13/5255* (2014.09); *G06T 19/003* (2013.01)

(58) Field of Classification Search
None
See application file for complete search history.

(56) References Cited

U.S. PATENT DOCUMENTS

2009/0118010 A1* 5/2009 Ashida ................. A63F 13/358
463/36
2011/0018868 A1    1/2011 Inoue et al.

FOREIGN PATENT DOCUMENTS

CN          1636612 A      7/2005
CN       101213003 A       7/2008
(Continued)

OTHER PUBLICATIONS

International Search Report received for PCT Application No. PCT/CN2018/071749 dated Apr. 4, 2018 (Chinese language only) (9 pp.).

(Continued)

*Primary Examiner* — Yi Wang
(74) *Attorney, Agent, or Firm* — Brinks Gilson & Lione

(57) ABSTRACT

This disclosure relates to automatic adjustment of position and orientation of a virtual character in a virtual scene of a virtual reality application. The initial position and orientation of the virtual character may be determined by sensors. The position and orientation of the virtual character may be adjusted without user action to a predetermined position and orientation for automatically triggering an event in the virtual reality application.

20 Claims, 5 Drawing Sheets

(51) Int. Cl.
*G06T 19/00* (2011.01)
*A63F 13/5255* (2014.01)
*A63F 13/428* (2014.01)
*A63F 13/216* (2014.01)
*A63F 13/25* (2014.01)
*A63F 13/212* (2014.01)
*A63F 13/22* (2014.01)
*A63F 13/211* (2014.01)

(56) References Cited

FOREIGN PATENT DOCUMENTS

| | | |
|---|---|---|
| CN | 101721811 A | 6/2010 |
| CN | 102755745 A | 10/2012 |
| EP | 1 550 490 A1 | 7/2005 |
| JP | H 11-195131 A | 7/1999 |
| JP | 2003-296757 A | 10/2003 |
| JP | 2005-025563 A | 1/2005 |
| JP | 2015-095045 A | 5/2015 |

OTHER PUBLICATIONS

Office Action dated Apr. 22, 2019 for Chinese Application No. 201710040064.8, 6 pages.
Unity—Manual: VR Overview, Version: 5.4 dated Sep. 8, 2015, Available at URL:https://web.archive.org/web/20160908111923/https://docs.unity3d.com/540/Documentation/Manual/VROverview.html, 5 pages.
Above And Beyond Software, Announcing Walk About, YouTube Video dated Mar. 23, 2016, Available at URL: https://www.youtube.com/watch?v=pW6nILV88Zk, 1 page.
Slayemin, Design Guide for Room Scale VR, dated May 18, 2016, Available at URL: https://www.gamedev.net/articles/game-design/game-design-and-theory/design-guide-for-room-scale-vr-r4355/, 16 pages.
Office Action dated Jun. 1, 2020 for Japanese Application No. 2019-520851, 16 pages.

* cited by examiner

METHOD AND DEVICE FOR DETERMINING AND ADJUSTING SPATIAL ATTRIBUTE OF VIRTUAL CHARACTER IN VIRTUAL REALITY APPLICATIONS

RELATED APPLICATION

This application is a continuation application of International PCT Application No. PCT/CN2018/071749, filed with the Chinese Patent Office on Jan. 8, 2018, and claims priority to Chinese Patent Application No. 2017100400648, entitled "SPATIAL ATTRIBUTE DETERMINING METHOD AND APPARATUS FOR VIRTUAL CHARACTER" filed with the Chinese Patent Office on Jan. 18, 2017, both of which are incorporated by reference in their entirety.

FIELD OF THE TECHNOLOGY

Embodiments of the present disclosure relate to the field of computers, and specifically, to methods, device for determining and adjusting position and orientation of a virtual character in a virtual scene of a virtual reality application.

BACKGROUND OF THE DISCLOSURE

Currently, only a position that is of a zone in a real environment and that is in a corresponding virtual zone in a virtual reality (VR) can be set in a virtual application, a relative position of a virtual character corresponding to a user in a virtual zone is determined by hardware such as sensors, and a program cannot directly modify a position and an orientation of the virtual character. Therefore, a position and an orientation in a virtual application are usually set to a position and an orientation that are preset in the virtual application. After the virtual application is started, the virtual character corresponding to the user needs to relocate to a desired position and an orientation in the virtual zone before starting a virtual game. The user thus may need to take a series of real actions (motions such as turning his/her head/body) to achieve such relocation in the virtual application. In this disclosure, the term spatial attribute is used to represent the position and orientation. As such, a spatial attribute of the virtual character in the virtual application includes the position and orientation of the virtual character in the virtual scene of the virtual application. A relative spatial attribute may be used to represent relative position and relative orientation.

Each time the virtual character corresponding to the user enters the virtual application, the user needs to control the virtual character to relocate to a predetermined spatial attribute, for example, an initial position and orientation, making it inflexible to determine a spatial attribute of the virtual character, and degrading user experience of the virtual application.

Currently, there is no effective solution to the foregoing problem of low flexibility in determining the spatial attribute of the virtual character, and adjusting the spatial attribute of the virtual character in a virtual scene without user action.

SUMMARY

Embodiments of the present disclosure provide an automatic spatial attribute determination and adjustment method and apparatus for a virtual character, and a storage medium, to resolve at least a technical problem of low flexibility in determining a spatial attribute of a virtual character in the related technology.

According to one aspect of the embodiments of the present disclosure, a spatial attribute determining method for a virtual character is provided. The spatial attribute determining method for a virtual character includes: obtaining a first reference spatial attribute of a virtual character in a preset virtual scene, the first reference spatial attribute coinciding with a predetermined spatial attribute to be reached by the virtual character; obtaining a first relative spatial attribute of a current spatial attribute of the virtual character relative to the first reference spatial attribute; adjusting the first reference spatial attribute to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and updating the current spatial attribute of the virtual character to the predetermined spatial attribute according to the second reference spatial attribute and the first relative spatial attribute.

According to another aspect of the embodiments of the present disclosure, a spatial attribute determining apparatus for a virtual character is further provided. The spatial attribute determining apparatus for a virtual character includes one or more processors and one or more memories storing a program unit, the program unit being executed by the processor, and the program unit including: a first obtaining unit, configured to obtain a first reference spatial attribute of a virtual character in a preset virtual scene, the first reference spatial attribute coinciding with a predetermined spatial attribute to be reached by the virtual character; a second obtaining unit, configured to obtain a first relative spatial attribute of a current spatial attribute of the virtual character relative to the first reference spatial attribute; an adjustment unit, configured to adjust the first reference spatial attribute to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and an update unit, configured to update the current spatial attribute of the virtual character to the predetermined spatial attribute according to the second reference spatial attribute and the first relative spatial attribute.

According to another aspect of the embodiments of the present disclosure, a storage medium is further provided, the storage medium storing a computer program, and the computer program being configured to perform, during running, the spatial attribute determining method for a virtual character in the embodiments of the present disclosure.

According to another aspect of the embodiments of the present disclosure, an electronic apparatus is further provided. The electronic apparatus includes a memory and a processor, the memory storing a computer program, and the processor being configured to run the computer program to perform the spatial attribute determining method for a virtual character in the embodiments of the present disclosure.

In the embodiments of the present disclosure, a first reference spatial attribute of a virtual character is obtained in a preset virtual scene, the first reference spatial attribute coinciding with a predetermined spatial attribute to be reached by the virtual character; a first relative spatial attribute of a current spatial attribute of the virtual character relative to the first reference spatial attribute is obtained; the first reference spatial attribute is adjusted to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and the current spatial attribute of the virtual character is updated to the predetermined spatial attribute according to the second reference spatial attribute and the first relative spatial attribute. The first relative spatial attribute of the current spatial attribute of the virtual character and that is relative to the first reference spatial attribute is obtained, the first reference spatial attribute is adjusted to the second reference spatial attribute according to the first relative spatial attribute, and the current spatial attribute of the virtual character is updated to the predetermined spatial attribute according to the second reference spatial attribute and the first relative spatial attribute, to adjust a position of the virtual character in the preset virtual scene, so that a user does not need to control the virtual character to find the predetermined spatial attribute, thereby achieving a technical effect of flexibly determining a spatial attribute of the virtual character, and resolving the technical problem of low flexibility in determining the spatial attribute of the virtual character in the related technology.

BRIEF DESCRIPTION OF THE DRAWINGS

The accompanying drawings are intended to provide further understanding of embodiments of the present disclosure and constitute part of this application. The exemplary embodiments of the present disclosure and descriptions thereof are intended to explain the present disclosure, and do not constitute any limitation to the present disclosure. In the accompanying drawings.

DESCRIPTION OF EMBODIMENTS

To make a person skilled in the art understand the solutions in the present disclosure better, the following clearly and completely describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

It should be noted that terms in the specification and claims of the present disclosure and the foregoing accompanying drawings such as "first" and "second" are used for differentiating similar objects, and are not necessarily used for describing a particular sequence or an order. It should be understood that, data used in this way is exchangeable in a proper case, so that the embodiments of the present disclosure that are described herein can be implemented in another order except those shown or described herein. Moreover, the terms "include", "contain" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

According to one aspect of the embodiments of the present disclosure, an embodiment of a spatial attribute determination and adjustment method for a virtual character is provided.

Figure 1:
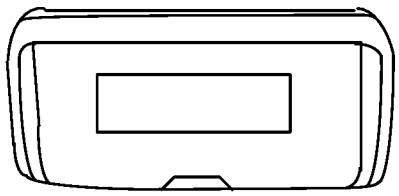
FIG. 1 is a schematic diagram of a VR helmet according to an embodiment of the present disclosure.

Optionally, in this embodiment, the spatial attribute determination and adjustment method for a virtual character may be applied to a VR helmet shown in FIG. 1. FIG. 1 is a schematic diagram of a VR helmet according to an embodiment of the present disclosure. As shown in FIG. 1, the spatial attribute determination and adjustment method for a virtual character in this embodiment of the present disclosure may be performed by the VR helmet. The VR helmet may have a display function, may be installed with a VR application, and is applicable to a VR scene.

The following describes in detail the foregoing spatial attribute determination and adjustment method for a virtual character in this embodiment of the present disclosure.

Figure 2:
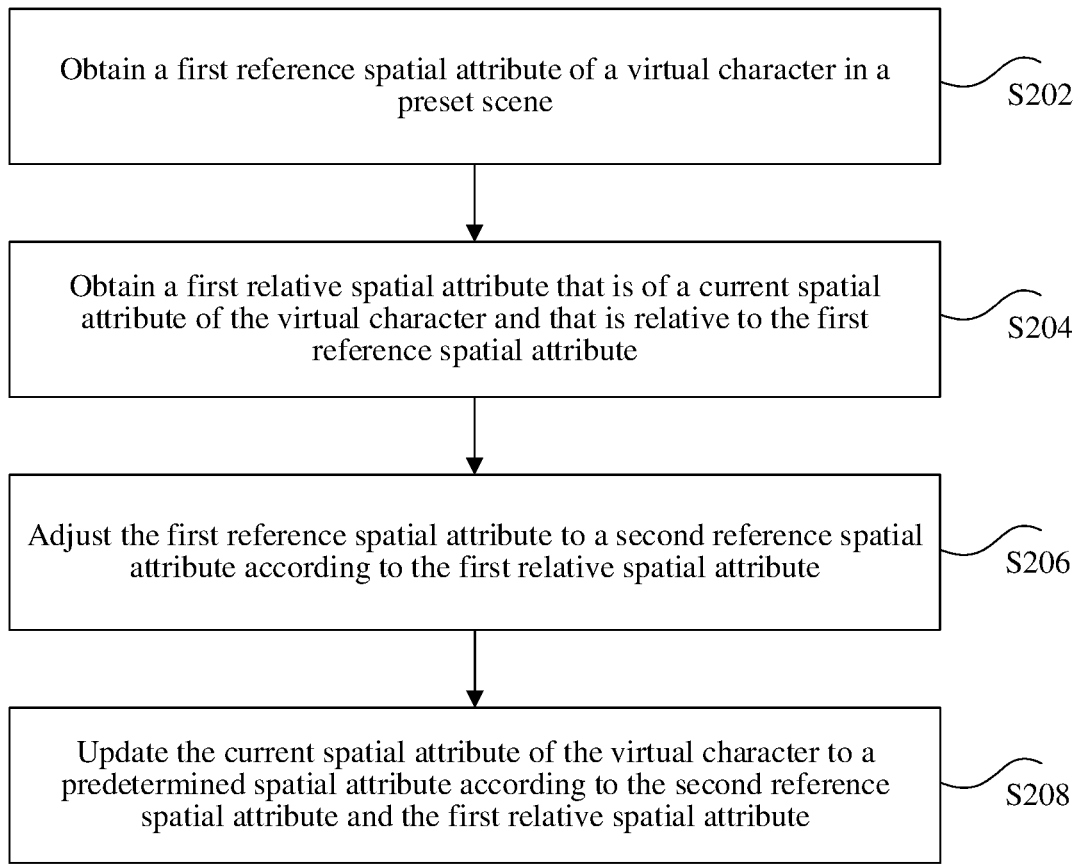
FIG. 2 is a flowchart of a spatial attribute determination and adjustment method for a virtual character according to an embodiment of the present disclosure.

FIG. 2 is a flowchart of a spatial attribute determination and adjustment method for a virtual character according to an embodiment of the present disclosure. As shown in FIG. 2, the spatial attribute determination and adjustment method for a virtual character may include the following steps:

Step S202. Obtain a first reference spatial attribute of a virtual character in a preset virtual scene.

In the technical solution provided in step S202 of the present disclosure, the first reference spatial attribute of the virtual character is obtained in the preset virtual scene, the first reference spatial attribute coinciding with a predetermined spatial attribute to be reached by the virtual character.

In this embodiment, the virtual character is a character corresponding to a user in a virtual application, and behaviors of the virtual character correspond to actual behaviors of the user. For example, the user enables, through an actual action such as moving forward, moving backward, or making a turn, the virtual character to also perform a corresponding action such as moving forward, moving backward, or making a turn. The preset virtual scene of the virtual application is a scene of a virtual character activity, and may be a game scene with particular game rules. Optionally, the virtual application is a VR application.

The first reference spatial attribute of the virtual character in the preset virtual scene is obtained. The first reference spatial attribute coincides with the predetermined spatial attribute to be reached by the virtual character. The predetermined spatial attribute is a preset spatial attribute of the virtual character in the virtual application when the virtual character is to execute a preset event, and is preset by using a program of the virtual application. For example, the predetermined spatial attribute is a spatial attribute and an orientation that need to be set for the virtual character in the preset virtual scene according to a game rule. When the preset event is an event of starting a game, the predetermined spatial attribute may be a preset initial position and a preset orientation of the virtual character in the preset virtual scene when the game is started. That is, when the virtual character is finally in the predetermined spatial attribute, the virtual character executes the preset event, set in the virtual application, of starting the game. The first reference spatial attribute may be a spatial attribute of a reference object in the preset virtual scene. The reference object is an object for reference when the spatial attribute of the virtual character in the preset virtual scene is set. For example, in an actual scene, if the user enters a particular zone, the virtual character corresponding to the user in the VR application enters a virtual zone corresponding to the zone in the real scene. The virtual zone is the reference object of the virtual character.

The first reference spatial attribute coincides with the predetermined spatial attribute. Optionally, a reference spatial attribute of the reference object is set to a spatial attribute coinciding with the predetermined spatial attribute by using the program. For example, an orientation of the reference object is set to a target orientation preset in the virtual application. In a preset coordinate system, an angle of the reference object coincides with a preset orientation in the virtual application. A position of the reference object is set to a predetermined position that is preset in the virtual application. Coordinates or position of the reference object coincide with predetermined position and orientation in the virtual application.

Step S204. Obtain a first relative spatial attribute of a current spatial attribute of the virtual character relative to the first reference spatial attribute.

In the technical solution provided in step S204 in the present disclosure, the current spatial attribute for indicating the spatial attribute of the virtual character in the preset virtual scene currently is obtained. The current spatial attribute is determined by hardware and cannot be directly modified by the program. For example, the current spatial attribute may be a current position and a current orientation of the virtual character in the preset virtual scene. The current position and the current orientation are determined by a device sensor and cannot be directly modified by the program. After the first reference spatial attribute of the virtual character is obtained, the first relative spatial attribute of the current spatial attribute of the virtual character relative to the first reference spatial attribute is obtained. The first relative spatial attribute is determined by the hardware and the program cannot directly modify the first relative spatial attribute. That is, the first relative spatial attribute between the virtual character and the reference object is determined by the hardware, for example, is determined by the device sensor, and the program cannot directly modify the first relative spatial attribute between the virtual character and the reference object, but the program can modify the first reference spatial attribute for indicating the spatial attribute of the reference object in the preset virtual scene.

Optionally, when the first relative spatial attribute of the current spatial attribute of the virtual character relative to the first reference spatial attribute is obtained, an angle difference between an orientation of the virtual character in the preset virtual scene and the orientation of the reference object is obtained. The angle difference is an included angle between the orientation of the virtual character in the preset virtual scene and the orientation of the reference object. Alternatively, position difference between position of the virtual character in the preset virtual scene and position of the reference object may be obtained. Alternatively, both the angle difference between the orientation of the virtual character in the preset virtual scene and the orientation of the reference object and the position difference between the position of the virtual character in the preset virtual scene and the position of the reference object are obtained.

Step S206. Adjust the first reference spatial attribute to a second reference spatial attribute according to the first relative spatial attribute.

In the technical solution provided in step S206 in the present disclosure, the first reference spatial attribute is adjusted to the second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute.

The first relative spatial attribute is determined by the hardware and cannot be directly modified by the program, but the program can directly set and modify the first reference spatial attribute, the current spatial attribute is updated as the first reference spatial attribute is adjusted, and the relative spatial attribute between the updated current spatial attribute and the adjusted first reference spatial attribute is the first relative spatial attribute. Therefore, the program can directly set and modify the spatial attribute of the reference object in the preset virtual scene. In this way, after the spatial attribute of the reference object in the preset virtual scene is set and modified, the spatial attribute of the virtual character in the preset virtual scene can also be determined.

After the first relative spatial attribute of the current spatial attribute of the virtual character relative to the first reference spatial attribute is obtained, the first reference spatial attribute is adjusted to the second reference spatial attribute according to the first relative spatial attribute. The relative spatial attribute of the predetermined spatial attribute relative to the second reference spatial attribute is the first relative spatial attribute.

Step S208. Update the current spatial attribute of the virtual character to a predetermined spatial attribute according to the second reference spatial attribute and the first relative spatial attribute.

In the technical solution provided in step S208 in the present disclosure, after the first reference spatial attribute is adjusted to the second reference spatial attribute according to the first relative spatial attribute, a first reference spatial attribute of the reference object is adjusted in the preset virtual scene according to the first relative spatial attribute so that the current spatial attribute of the virtual character is updated to the predetermined spatial attribute. For example, after an angle difference between the current orientation of the virtual character and a reference orientation is obtained, the orientation of the reference object is adjusted so that the current orientation of the virtual character is updated to the target orientation. In this way, the position of the reference object can remain unchanged, and the reference object can be rotated in an opposite direction of a direction of the current orientation relative to the target orientation by an angle difference of the current orientation relative to the target orientation, so that the current orientation of the virtual character is updated to the target orientation.

When the current position of the virtual character does not coincide with the predetermined position in the virtual application, position difference between the current position of the virtual character and the position of the reference object are obtained. Position differences between the current position and a first reference position in the preset coordinate system may be obtained, and according to the position difference, the first reference position is offset by the foregoing position difference in an opposite direction of a direction of the current position relative to the reference position, to adjust the position of the reference object, so that the current position of the virtual character is updated to the predetermined position, thereby achieving an objective that the current spatial attribute coincides with the predetermined spatial attribute, and avoiding a problem of inflexible determining of the spatial attribute of the virtual character because the user would have to control the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In step S202 to step S208, the first reference spatial attribute of the virtual character in the preset virtual scene is obtained, the first reference spatial attribute coinciding with the predetermined spatial attribute to be reached by the virtual character; the first relative spatial attribute of the current spatial attribute of the virtual character relative to the first reference spatial attribute is obtained; the first reference spatial attribute is adjusted to the second reference spatial attribute according to the first relative spatial attribute, the relative spatial attribute of the predetermined spatial attribute relative to the second reference spatial attribute being the first relative spatial attribute, the current spatial attribute being updated as the first reference spatial attribute is adjusted, and the relative spatial attribute between the updated current spatial attribute and the adjusted first reference spatial attribute being the first relative spatial attribute; and the current spatial attribute of the virtual character is updated to the predetermined spatial attribute according to the second reference spatial attribute and the first relative spatial attribute. This can resolve the technical problem of low flexibility in determining a spatial attribute of a virtual character in the related technology, thereby achieving a technical effect of flexibly determining the spatial attribute of the virtual character.

In an optional implementation, step S202 of obtaining a first reference spatial attribute of a virtual character includes: obtaining, when a current position of the current spatial attribute coincides with a predetermined position of the predetermined spatial attribute, a first reference orientation of the first reference spatial attribute, the first reference orientation coinciding with a predetermined orientation of the predetermined spatial attribute.

The predetermined spatial attribute of the virtual character in the preset virtual scene includes the target orientation, also referred to as the predetermined orientation. That is, the target orientation of the virtual character in the preset virtual scene and that is set by the program of the virtual application is an orientation that is preset when the virtual character is to execute the preset event in the virtual application, and may be, using an angle in the preset coordinate system. The target orientation of the virtual character in the preset virtual scene of the virtual application is obtained when the current position of the current spatial attribute coincides with the predetermined position of the predetermined spatial attribute. Before the virtual character enters the virtual application and executes the preset event according to a preset rule, when the current position of the current spatial attribute coincides with the predetermined position of the predetermined spatial attribute, the preset event can be executed or triggered as long as the current orientation of the virtual character in the preset virtual scene is consistent with the target orientation. For example, the preset event is starting a game. The game can be directly started when the current orientation of the virtual character in the preset virtual scene is consistent with the target orientation. The predetermined spatial attribute of the virtual character in the preset virtual scene is obtained by obtaining the target orientation of the virtual character in the preset virtual scene.

The first reference orientation of the first reference spatial attribute is obtained, the first reference orientation coinciding with the predetermined orientation of the predetermined spatial attribute. The reference object may be an object for reference when the orientation of the virtual character in the preset virtual scene is set. A relative orientation between the reference object and the virtual character is determined by the hardware, for example, is determined by the device sensor, and the program cannot directly modify the relative orientation between the reference object and the virtual character, but the program can modify a reference orientation for indicating the orientation of the reference object in the preset virtual scene. The first reference orientation is set after the target orientation of the virtual character in the preset virtual scene of the virtual application is obtained, so that the first reference orientation coincides with the predetermined orientation of the predetermined spatial attribute. That is, the orientation of the reference object is set to an orientation coinciding with the target orientation by using the program, so that the angle of the reference object can be changed in the preset coordinate system, to make the orientation of the reference object coincide with the target orientation. The orientation of the reference object is set to the target orientation, so that the first reference orientation coincides with the predetermined orientation of the predetermined spatial attribute.

In an optional implementation, step S204 of obtaining a first relative spatial attribute of a current spatial attribute of the virtual character relative to the first reference spatial attribute includes: obtaining a first relative angle of a current orientation of the current spatial attribute relative to the first reference orientation.

The current orientation for indicating the orientation of the virtual character in the preset virtual scene of the virtual application currently is obtained when the virtual character enters the preset virtual scene. The current orientation is determined by the hardware and cannot be directly modified by the program of the virtual application. The first relative angle of the current orientation of the current spatial attribute relative to the first reference orientation is obtained after the first reference orientation of the first reference spatial attribute is obtained. That is, the angle difference between the current orientation of the virtual character and the orientation of the reference object is obtained. The angle difference is an included angle between the orientation of the virtual character in the preset virtual scene and the orientation of the reference object. The first relative spatial attribute of the current spatial attribute of the virtual character relative to the first reference spatial attribute is obtained by obtaining the first relative angle of the current orientation of the current spatial attribute relative to the first reference orientation.

In an optional implementation, step S206 of adjusting the first reference spatial attribute to a second reference spatial attribute according to the first relative spatial attribute includes: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle.

The first relative angle is determined by the hardware and cannot be directly modified by the program, but the program can directly set and modify the orientation of the reference object in the preset virtual scene. That is, the first reference orientation is adjustable. The current orientation is updated as the first reference orientation is adjusted, the relative angle between the updated current orientation and the adjusted first reference orientation is the first relative angle, and the first relative spatial attribute includes the first relative angle. In this way, the orientation of the virtual character in the preset virtual scene is accordingly determined after the orientation of the reference object in the preset virtual scene is set and modified.

After the first relative angle of the current orientation of the current spatial attribute relative to the first reference orientation is obtained, the first reference orientation is adjusted, according to the first relative angle, to the second reference orientation of the second reference spatial attribute, and the relative angle of the predetermined orientation relative to the second reference orientation is the first relative angle. In this way, the position of the reference object can remain unchanged, and the orientation of the reference object is rotated by using a preset point as a rotation center. In this case, the orientation of the reference object deviates from the target orientation, and the current orientation of the virtual character rotates with the rotation of the orientation of the reference object, until the current orientation of the virtual character coincides with the target orientation, so that the adjusted current orientation of the virtual character coincides with the target orientation, thereby avoiding a problem of inflexible determining of the spatial attribute of the virtual character because the user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, the adjusting, according to the first relative angle, the first reference orientation to a second reference orientation of the second reference spatial attribute includes: determining that a direction of the current orientation relative to the first reference orientation is an angle direction of the first relative angle; and rotating the first reference orientation to the second reference orientation in an opposite direction of the angle direction by an angle difference of the first relative angle.

Figure 3:
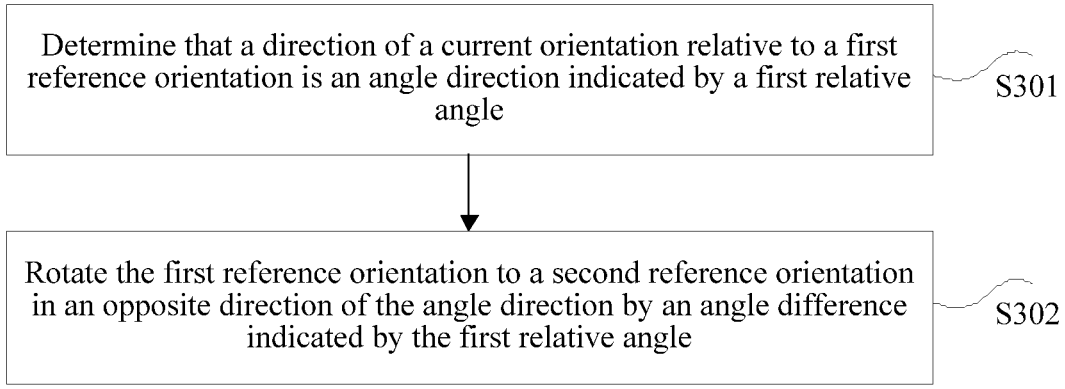
FIG. 3 is a flowchart of a method for adjusting, according to a first relative angle, a first reference orientation to a second reference orientation of a second reference spatial attribute according to an embodiment of the present disclosure.

FIG. 3 is a flowchart of a method for adjusting, according to a first relative angle, a first reference orientation to a second reference orientation of a second reference spatial attribute according to an embodiment of the present disclosure. As shown in FIG. 3, the method includes the following steps:

Step S301. Determine that a direction of a current orientation relative to the first reference orientation is an angle direction indicated by the first relative angle.

In the technical solution provided in step S301 of the present disclosure, in a preset virtual scene, the direction of the current orientation relative to the first reference orientation may be an orientation of a virtual character relative to the reference object, that is, an orientation of the virtual character and that uses an orientation of the reference object as a reference. For example, the orientation of the reference object is a northward orientation in the preset virtual scene, and the orientation of the virtual character relative to the reference object is 45° north to west in the preset virtual scene.

Step S302. Rotate the first reference orientation to the second reference orientation in an opposite direction of the angle direction by an angle difference indicated by the first relative angle.

In the technical solution provided in step S302 of the present disclosure, after the direction of the current orientation relative to the first reference orientation is determined as the angle direction indicated by the first relative angle, because the first relative angle remains unchanged, the reference object is rotated in the opposite direction of the angle direction by the angle difference indicated by the first relative angle. The orientation of the reference object may be rotated by using a preset point as a rotation point in the opposite direction of the angle direction indicated by the first relative angle. In this case, the orientation of the reference object deviates from a target orientation, and the current orientation of the virtual character rotates as the reference orientation is rotated. When an angle of rotation reaches the angle difference, the rotated current orientation of the virtual character coincides with the target orientation, thereby achieving an objective that the current orientation of the virtual character coincides with the target orientation, and improving flexibility in determining a spatial attribute of the virtual character.

In this embodiment, the direction of the current orientation relative to the first reference orientation is determined as the angle direction indicated by the first relative angle; and the first reference orientation is rotated to the second reference orientation in the opposite direction of the angle direction by the angle difference indicated by the first relative angle, so that the first reference orientation is adjusted, according to the first relative angle, to the second reference orientation of the second reference spatial attribute.

In an optional implementation, step S208 of updating the current spatial attribute of the virtual character to a predetermined spatial attribute according to the second reference spatial attribute and the first relative spatial attribute includes: updating the current orientation of the virtual character to the predetermined orientation according to the second reference orientation and the first relative angle.

After the first reference orientation is adjusted, according to the first relative angle, to the second reference orientation of the second reference spatial attribute, because the first relative angle remains unchanged, the current orientation of the virtual character is updated to the predetermined orientation according to the second reference orientation and the first relative angle, that is, the current orientation coincides with the predetermined orientation, thereby avoiding a problem of inflexible determining of the spatial attribute of the virtual character because a user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, step S202 of obtaining a first reference spatial attribute of a virtual character includes: obtaining, when a current orientation of the current spatial attribute coincides with a predetermined orientation of the predetermined spatial attribute, a first reference position of the first reference spatial attribute, the first reference position coinciding with a predetermined position of the predetermined spatial attribute.

The predetermined spatial attribute of the virtual character in the preset virtual scene includes the predetermined position, which is a position that is preset when the virtual character is to execute a preset event in a virtual application, and may be indicated by using coordinates in a preset coordinate system. Optionally, the first reference position of the first reference spatial attribute is obtained when the current orientation of the current spatial attribute coincides with the predetermined orientation of the predetermined spatial attribute. Optionally, before the virtual character enters the virtual application and executes the preset event according to a preset rule, when the current orientation of the current spatial attribute coincides with the predetermined orientation of the predetermined spatial attribute, the preset event can be executed as long as the current position of the virtual character in the preset virtual scene is consistent with the predetermined position. For example, a game is started immediately when the current position of the virtual character in the preset virtual scene is consistent with the predetermined position.

The first reference position may be a position of the reference object in the preset virtual scene. The reference object may be an object for reference when a position of the virtual character in the preset virtual scene is set. A relative position between the reference object and the virtual character is determined by hardware, for example, is determined by a device sensor, and a program cannot directly modify the relative position between the reference object and the virtual character, but the program can modify a reference position for indicating the position of the reference object in the preset virtual scene.

After the predetermined position of the virtual character in the preset virtual scene of the virtual application is obtained, the first reference position of the first reference spatial attribute is obtained. The first reference position coincides with the predetermined position of the predetermined spatial attribute. Optionally, the position of the reference object is set to the predetermined position of the predetermined spatial attribute. That is, the position of the reference object is set to the orientation coinciding with the predetermined position by using the program, so that an angle of the reference object can be changed in the preset coordinate system, to make the position of the reference object coincide with the predetermined position. The position of the reference object is set to the predetermined position, so that the first reference position coincides with the predetermined position of the predetermined spatial attribute.

In an optional implementation, step S204 of obtaining a first relative spatial attribute of a current spatial attribute of the virtual character relative to the first reference spatial attribute includes: obtaining first relative position of a current position of the current spatial attribute relative to the first reference position.

The current position of the current spatial attribute is obtained when the virtual character enters the preset virtual scene of the virtual application. That is, the current position for indicating an position of the virtual character in the preset virtual scene currently is obtained, and the current position is determined by the hardware and cannot be directly modified by the program of the virtual application. After the first reference position of the first reference spatial attribute is obtained, the first relative position of the current position of the current spatial attribute relative to the first reference position are obtained, and the position difference between the current position of the virtual character and the position of the reference object may be obtained. The position difference may be differences between coordinate values of the virtual character in the preset coordinate system and coordinate values of the reference object in the preset coordinate system. The first relative position of the current position of the current spatial attribute relative to the first reference position are obtained, to obtain the first relative spatial attribute of the current spatial attribute of the virtual character relative to the first reference spatial attribute.

In an optional implementation, step S206 of adjusting the first reference spatial attribute to a second reference spatial attribute according to the first relative spatial attribute includes: adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being first relative position, and the first relative spatial attribute including the first relative position.

The first relative position are determined by the hardware and cannot be directly modified by the program, but the program can directly set and modify the position of the reference object in the preset virtual scene. The current position are updated as the first reference position are adjusted. Relative position between the updated coordinates of the current position and the adjusted coordinates of the first reference position are the first relative position. The first relative spatial attribute includes the first relative position. In this way, the position of the virtual character in the preset virtual scene is accordingly determined after the position of the reference object in the preset virtual scene is set and modified.

After the first relative position of the current position of the current spatial attribute relative to the first reference position are obtained, the first reference position are adjusted, according to the first relative position, to the second reference position of the second reference spatial attribute. That is, the position of the reference object is adjusted to the second reference position according to the first relative position in the preset virtual scene, so that the current position coincides with the predetermined position. Optionally, the first reference position is offset in an opposite direction of a direction of the current position relative to the first reference position by position difference indicated by the first relative position. In this case, the position of the reference object deviates from the predetermined position, and the current position of the virtual character moves as the position of the reference object moves, until the current position of the virtual character coincides with the predetermined position, so that the adjusted current position of the virtual character coincides with the predetermined position, thereby avoiding a problem of inflexible determining of the spatial attribute of the virtual character because the user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, the adjusting, according to the first relative position, the first reference position to a second reference position of the second reference spatial attribute includes: determining that a direction of the current position relative to the first reference position is a coordinate direction indicated by the first relative position; and offsetting the first reference position to the second reference position in an opposite direction of the coordinate direction by position difference indicated by the first relative position.

Figure 4:
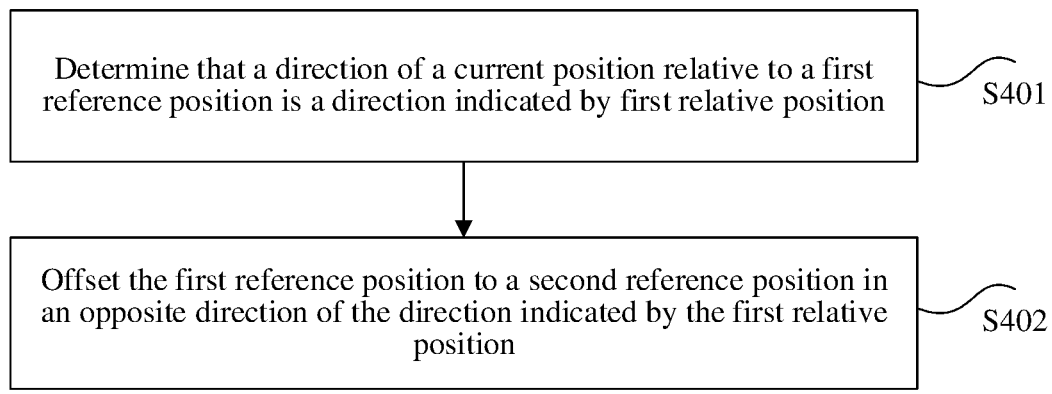
FIG. 4 is a flowchart of a method for adjusting, according to first relative position, a first reference position to a second reference position of a second reference spatial attribute according to an embodiment of the present disclosure.

FIG. 4 is a flowchart of a method for adjusting, according to first relative position, a first reference position to a second reference position of a second reference spatial attribute according to an embodiment of the present disclosure. As shown in FIG. 4, the method includes the following steps:

Step S401. Determine that a direction of a current position relative to the first reference position is a coordinate direction indicated by the first relative position.

In the technical solution provided in step S401 of the present disclosure, after obtaining the first relative position of the current position of the current spatial attribute relative to the first reference position are obtained, the direction of the current position relative to the first reference position is determined as the coordinate direction indicated by the first relative position. In a preset virtual scene, a position of a virtual character that is relative to a position of a reference object is a position of the virtual character using the position of the reference object as a reference. For example, coordinates of the reference object in a preset coordinate system are (0, 0), and coordinates of the virtual character in the preset coordinate system are (a, b). The position of the virtual character relative to the reference object is a position determined after the virtual character deviates from the reference object by a distance a on a horizontal axis and deviates from the reference object by a distance b on a vertical axis. The direction of the current position relative to the first reference position is a direction in which the virtual character deviates from the reference object by the distance a on the horizontal axis and deviates from the reference object by the distance b on the vertical axis, and is determined as the coordinate direction indicated by the first relative position.

Step S402. Offset the first reference position to the second reference position in an opposite direction of the coordinate direction by position difference indicated by the first relative position.

In the technical solution provided in step S402 of the present disclosure, after the direction of the current position relative to the first reference position is determined as the coordinate direction indicated by the first relative position, the first reference position are offset to the second reference position in the opposite direction of the coordinate direction by the position difference indicated by the first relative position. The position of the reference object may be offset by the position difference. In this case, the position of the reference object deviates from a predetermined position, and the current position of the virtual character moves as a reference position moves. When a deviation distance reaches the position difference indicated by the first relative position, the deviated current position of the virtual character coincides with the predetermined position, thereby achieving an objective that the current position of the virtual character coincides with the predetermined position, and improving flexibility in determining a spatial attribute of the virtual character.

In this embodiment, the direction of the current position relative to the first reference position is determined as the coordinate direction indicated by the first relative position; and the first reference position are offset to the second reference position in the opposite direction of the coordinate direction by the position difference indicated by the first relative position, so that the first reference position are adjusted to the second reference position indicated by the second reference spatial attribute according to the first relative position.

In an optional implementation, step S208 of updating the current spatial attribute of the virtual character to a predetermined spatial attribute according to the second reference spatial attribute and the first relative spatial attribute includes: updating coordinates of the current position of the virtual character to the predetermined position according to the second reference position and the first relative position.

After the first reference position are offset to the second reference position in the opposite direction of the coordinate direction by the position difference indicated by the first relative position, because the first relative position remain unchanged, the current position are updated to the predetermined position according to the second reference position and the first relative position, that is, the current position coincide with the predetermined position, thereby avoiding a problem of inflexible determining of the spatial attribute of the virtual character because a user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, step S202 of obtaining a first reference spatial attribute of a virtual character includes: obtaining a first reference orientation and a first reference position that are of the first reference spatial attribute, when a current position of the current spatial attribute does not coincide with a predetermined position of the predetermined spatial attribute and a current orientation of the current spatial attribute does not coincide with a target orientation of the predetermined spatial attribute, the first reference orientation coinciding with a predetermined orientation of the predetermined spatial attribute, and the first reference position coinciding with the predetermined position of the predetermined spatial attribute.

The predetermined spatial attribute of the virtual character in the preset virtual scene includes the target orientation and the predetermined position. That is, the target orientation and the predetermined position that are of the virtual character in the preset virtual scene and that are set by a program of a virtual application are an orientation and a position that are preset when the virtual character is to execute a preset event in the virtual application, and may be indicated by using an angle and coordinates in the preset coordinate system. Optionally, when the current position of the current spatial attribute does not coincide with the predetermined position of the predetermined spatial attribute, and the current orientation of the current spatial attribute does not coincide with the target orientation of the predetermined spatial attribute, before the virtual character enters the virtual application and executes a preset event according to a preset rule, the preset event can be executed only when the current orientation of the virtual character in the preset virtual scene is consistent with the target orientation and the current position is consistent with the predetermined position. For example, a game can be started only when the current orientation of the virtual character in the preset virtual scene is consistent with the target orientation and the current position is consistent with the predetermined position.

The first reference orientation and the first reference position that are of the first reference spatial attribute are obtained, the first reference orientation coinciding with the predetermined orientation of the predetermined spatial attribute, and the first reference position coinciding with the predetermined position of the predetermined spatial attribute. The reference object may be an object for reference when the orientation and the position of the virtual character in the preset virtual scene are set. A relative orientation and a relative position between the reference object and the virtual character are determined by hardware, for example, are determined by a device sensor, and the program cannot directly modify the relative orientation and the relative position between the reference object and the virtual character, but the program can modify a reference orientation and a reference position for indicating the orientation of the reference object in the preset virtual scene. After the target orientation and the predetermined position that are of the virtual character in the preset virtual scene of the virtual application are obtained, the orientation of the reference object is set to the target orientation, and the position of the reference object is set to the predetermined position, so that the first reference orientation coincides with the predetermined orientation of the predetermined spatial attribute, and the first reference position coincides with the predetermined position of the predetermined spatial attribute. An angle of the reference object can be changed in the preset coordinate system, to make the orientation of the reference object coincide with the target orientation, and the reference object are changed in the preset coordinate system, to make the position of the reference object coincide with the predetermined position.

In an optional implementation, step S204 of obtaining a first relative spatial attribute of a current spatial attribute of the virtual character relative to the first reference spatial attribute includes: obtaining a first relative angle of the current orientation of the current spatial attribute relative to the first reference orientation; and obtaining first relative position of the current position of the current spatial attribute relative to the first reference position.

When the virtual character enters the preset virtual scene of the virtual application, the current orientation for indicating the orientation of the virtual character in the preset virtual scene currently is obtained, and the current position of the current spatial attribute is obtained. The current orientation and the current position are determined by the hardware and cannot be directly modified by the program of the virtual application. After the first reference orientation of the first reference spatial attribute and the first reference position of the first reference spatial attribute are obtained, the first relative angle of the current orientation of the current spatial attribute relative to the first reference orientation and the first relative position of the current position of the current spatial attribute relative to the first reference position are obtained. That is, an angle difference between the current orientation of the virtual character and the orientation of the reference object is obtained, and the position difference between the current position of the virtual character and the position of the reference object are obtained. The first relative spatial attribute of the current spatial attribute of the virtual character relative to the first reference spatial attribute is obtained by obtaining the first relative angle of the current orientation of the current spatial attribute relative to the first reference orientation and the first relative position of the current position of the current spatial attribute relative to the first reference position.

Figure 5:
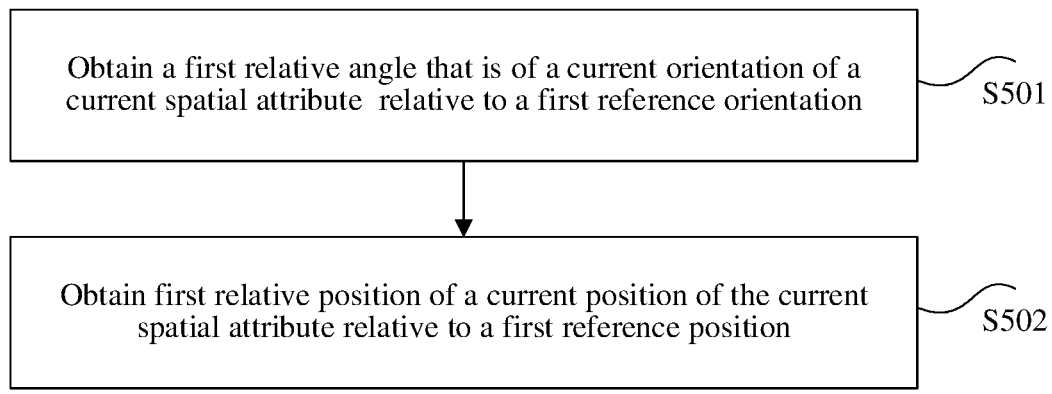
FIG. 5 is a flowchart of a method for obtaining a first relative spatial attribute of a current spatial attribute of a virtual character relative to a first reference spatial attribute according to an embodiment of the present disclosure.

FIG. 5 is a flowchart of a method for obtaining a first relative spatial attribute of a current spatial attribute of a virtual character relative to a first reference spatial attribute according to an embodiment of the present disclosure. As shown in FIG. 5, the method includes the following steps:

Step S501. Obtain a first relative angle of a current orientation of the current spatial attribute relative to a first reference orientation.

In the technical solution provided in step S501 of the present disclosure, the current orientation for indicating an orientation of the virtual character in a preset virtual scene of a virtual application currently is obtained when the virtual character enters the preset virtual scene. The first relative angle of the current orientation of the current spatial attribute relative to the first reference orientation is obtained after the first reference orientation of the first reference spatial attribute is obtained. That is, an angle difference between the current orientation of the virtual character and an orientation of a reference object is obtained. The angle difference is an included angle between an orientation of the virtual character in the preset virtual scene and the orientation of the reference object.

Step S502. Obtain first relative position of a current position of the current spatial attribute relative to a first reference position.

In the technical solution provided in step S502 of the present disclosure, when the virtual character enters the preset virtual scene of the virtual application, the current position of the current spatial attribute is obtained, that is, the current position for indicating the orientation of the virtual character in the preset virtual scene currently is obtained. After the first reference position of the first reference spatial attribute is obtained, the first relative position of the current position of the current spatial attribute relative to the first reference position are obtained, and position difference between the current position of the virtual character and a position of the reference object may be obtained. The position difference may be differences between coordinate values of the virtual character in a preset coordinate system and coordinate values of the reference object in the preset coordinate system.

In this embodiment, the first relative spatial attribute of the current spatial attribute of the virtual character relative to the first reference spatial attribute is obtained by obtaining the first relative angle of the current orientation of the current spatial attribute relative to the first reference orientation and the first relative position of the current position of the current spatial attribute relative to the first reference position.

In an optional implementation, step S206 of adjusting the first reference spatial attribute to a second reference spatial attribute according to the first relative spatial attribute includes: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle. Step S208 of updating the current spatial attribute of the virtual character to the predetermined spatial attribute according to the second reference spatial attribute and the first relative spatial attribute includes: updating the current orientation of the virtual character to the predetermined orientation according to the second reference orientation and the first relative angle.

The current orientation is updated as the first reference orientation is adjusted, the relative angle between the updated current orientation and the adjusted first reference orientation is the first relative angle, and the first relative spatial attribute includes the first relative angle. In this way, the orientation of the virtual character in the preset virtual scene is accordingly determined after the orientation of the reference object in the preset virtual scene is set and modified.

After the first relative angle of the current orientation of the current spatial attribute relative to the first reference orientation is obtained, the first reference orientation is adjusted, according to the first relative angle, to the second reference orientation of the second reference spatial attribute, and the relative angle of the predetermined orientation relative to the second reference orientation is the first relative angle. In this way, the position of the reference object can remain unchanged, and the orientation of the reference object is rotated by using a preset point as a rotation center. In this case, the orientation of the reference object deviates from a target orientation, and the current orientation of the virtual character rotates with the rotation of the orientation of the reference object, until the current orientation of the virtual character coincides with the target orientation.

After rotating the first reference orientation to the second reference orientation in an opposite direction of an angle direction by the angle difference indicated by the first relative angle, because the first relative angle remains unchanged, the current orientation of the virtual character is updated to the predetermined orientation according to the second reference orientation and the first relative angle, thereby avoiding a problem of inflexible determining of the spatial attribute of the virtual character because a user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, after the updating the current orientation of the virtual character to the predetermined orientation according to the second reference orientation, the adjusting the first reference spatial attribute to a second reference spatial attribute according to the first relative spatial attribute further includes: adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being the first relative position, and the first relative spatial attribute including the first relative position; and the updating the current spatial attribute of the virtual character to the predetermined spatial attribute according to the second reference spatial attribute and the relative spatial attribute further includes: updating the current position of the virtual character to the predetermined position according to the second reference position and the first relative position.

The current position are updated as the first reference position are adjusted, the relative position between the updated coordinates of the current position and the adjusted coordinates of the first reference position are the first relative position, and the first relative spatial attribute includes the first relative position. In this way, the position of the virtual character in the preset virtual scene is accordingly determined after the position of the reference object in the preset virtual scene is set and modified.

After the first reference orientation is adjusted, according to the first relative angle, to the second reference orientation of the second reference spatial attribute, the first reference position are adjusted, according to the first relative position, to the a second reference position of the second reference spatial attribute, to make the current position coincide with the predetermined position. Optionally, the first reference position is offset in an opposite direction of a direction of the current position relative to the first reference position by position difference indicated by the first relative position. In this case, the position of the reference object deviates from the predetermined position, and the current position of the virtual character moves as the position of the reference object moves, until the current position of the virtual character coincides with the predetermined position, so that the adjusted current position of the virtual character coincides with the predetermined position.

After the first reference position are offset to the second reference position in the opposite direction of the coordinate direction by the position difference indicated by the first relative position, the current position of the virtual character are updated to the predetermined position according to the second reference position and the first relative position, that is, the current position coincide with the predetermined position, thereby avoiding a problem of inflexible determining of the spatial attribute of the virtual character because the user controls the virtual character to move in the preset virtual scene for determining the spatial attribute. This improves flexibility in determining the spatial attribute of the virtual character, and avoids a problem of poor experience caused by a case in which the virtual character corresponding to the user cannot be immediately used when the virtual character enters the preset virtual scene, thereby improving user experience.

In an optional implementation, after the updating the current spatial attribute of the virtual character to the predetermined spatial attribute according to the second reference spatial attribute, the method further includes: controlling the virtual character to execute a preset event in a virtual application.

After the current spatial attribute of the virtual character is updated to the predetermined spatial attribute according to the second reference spatial attribute and the first relative spatial attribute, the virtual character is controlled to execute the preset event in the virtual application. The preset event may be a behavior activity that starts the virtual character and that is executed in a game according to a game rule. The behavior activity is, for example, use of a weapon, attack, defense, or escape. This is not limited herein.

In an optional implementation, the virtual application is a VR application.

In the foregoing embodiment, the virtual application may be a VR application, and the foregoing method may be applied to a VR application related to a game scene and a real scene. The VR application is used for setting an initial position and an initial orientation of the virtual character corresponding to the user. Regardless of a position of the user in a real zone, the position and the orientation of the virtual character corresponding to the user in the game scene can be set to a position and an orientation that are preset in the VR application. This improves flexibility in determining the spatial attribute of the virtual character, so that the user can immediately experience the VR application, thereby avoiding impact on an experience effect of the user on the VR application caused by a case in which the virtual character corresponding to the user needs to search for a predetermined position and orientation each time the user enters the application.

The following describes the technical solutions of the present disclosure with reference to preferred embodiments.

In this embodiment, a hardware environment may be a HTC Vive device, the virtual application is a VR application, the preset virtual scene is a game scene, the virtual character is a virtual character corresponding to the user, and the reference object is a virtual room.

When the user enters a room in a real-world environment, the corresponding virtual character in the VR application through the HTC Vive device enters a virtual room corresponding to the room in the VR application. The virtual character and the virtual room are in the game scene. A relative position between the virtual character and the virtual room is determined by hardware, for example, is determined by a device sensor, and cannot be modified by a program, but the program can modify a spatial attribute of the virtual room in the game scene, including modifying an orientation and a position of the virtual room in the game scene.

A spatial attribute determination and adjustment method for the virtual character in this embodiment includes the following steps:

Step 1: In the game scene, set the position and the orientation of the virtual room to a position and an orientation that are preset in the VR application, the position and the orientation of the virtual room being a first reference spatial attribute, the position and the orientation that are preset in the VR application being a predetermined spatial attribute to be reached by the virtual character, and the first reference spatial attribute coinciding with the predetermined spatial attribute to be reached by the virtual character.

Figure 6:
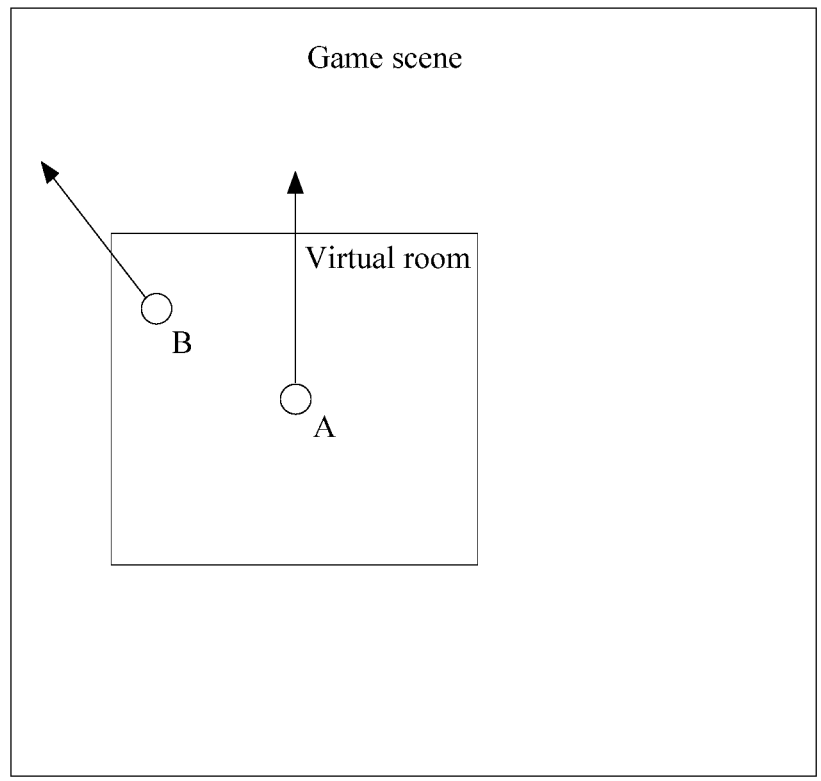
FIG. 6 is a schematic diagram of an initial state of a virtual character in a VR application according to an embodiment of the present disclosure.

FIG. 6 is a schematic diagram of an initial state of a virtual character in a VR application according to an embodiment of the present disclosure. The position of the virtual room is shown in FIG. 6. The orientation of the virtual room in the game scene is an orientation indicated by an arrow at a point A. A spatial attribute of the virtual room in the game scene is a predetermined spatial attribute to be finally reached by the virtual character. That is, the orientation of virtual room in the preset virtual scene is a target orientation to be finally reached by the virtual character, and the position of the virtual room in the preset virtual scene is a predetermined position to be finally reached by the virtual character. A current position of the virtual character in the game scene is in the upper left side of the virtual room, and a current orientation of the virtual character in the game scene is an orientation indicated by an arrow at a point B. An included angle between the current orientation of the virtual character and the orientation of the virtual room is $\alpha$. The included angle $\alpha$ is obtained, that is, a first relative angle being $\alpha$ between the current orientation of a current spatial attribute of the virtual character and a first reference orientation of the first reference spatial attribute is obtained.

Step 2: After the included angle $\alpha$ between the current orientation of the virtual character and the orientation of the virtual room is obtained, rotate the virtual room around the point A by the angle $\alpha$ in an opposite direction of a direction of the current orientation relative to the first reference orientation, that is, obtain a first relative angle of the current orientation of the current spatial attribute relative to the first reference orientation, rotate the first reference orientation to a second reference orientation in the foregoing opposite direction by an angle difference indicated by the first relative angle, and update the current orientation of the virtual character to a predetermined orientation according to the second reference orientation and the first relative angle.

Figure 7:
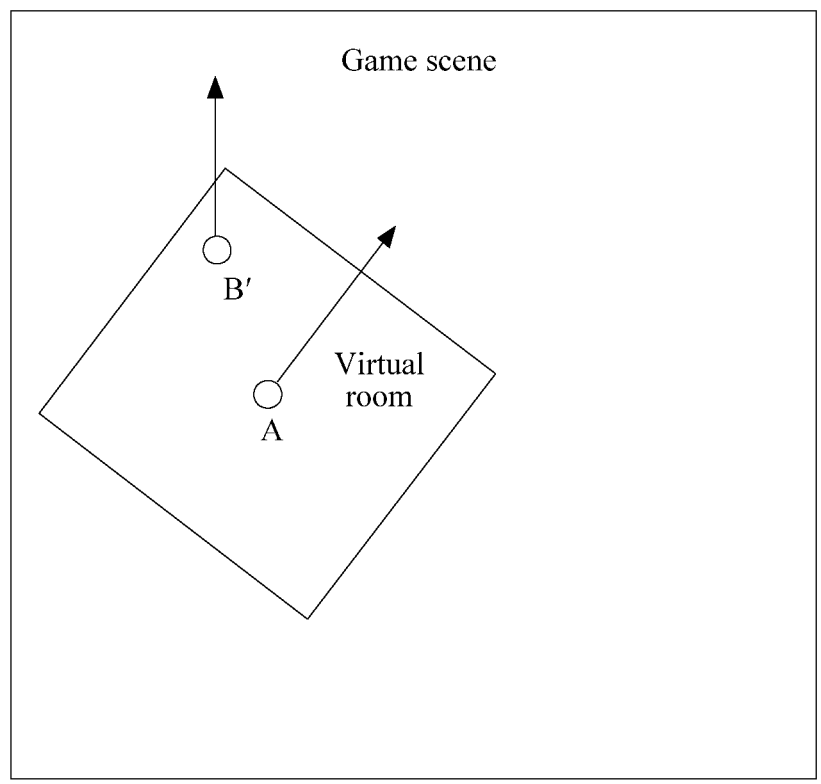
FIG. 7 is a schematic diagram of adjusting an orientation of a virtual character according to an embodiment of the present disclosure.

FIG. 7 is a schematic diagram of adjusting an orientation of a virtual character according to an embodiment of the present disclosure. As shown in FIG. 7, a relative orientation between the virtual character and the virtual room is determined by the hardware, for example, is determined by the device sensor, and the program cannot directly modify the relative orientation between the virtual character and the virtual room, but the program can modify the orientation of the virtual room in the game scene. In the preset virtual scene, the orientation of the virtual room in the game scene is adjusted according to the included angle $\alpha$ between the orientation of the virtual character and the orientation of the virtual room, to make the current orientation of the virtual character in the game scene coincide with a target orientation set in the game. Optionally, the position of the virtual room in the game scene remains unchanged, and the virtual character is rotated around the point A by the angle $\alpha$ in an opposite direction of a direction of the virtual character relative to the virtual room. In this case, the orientation of the virtual room deviates from the target orientation. Because the relative orientation between the virtual character and the virtual room remains unchanged, the current orientation of the virtual character changes as the orientation of the virtual room changes. An orientation indicated by an arrow on a point B' is an adjusted orientation of the virtual character, so that the current orientation of the virtual character after the rotation coincides with the target orientation.

Step 3: Obtain position difference between the current position of the virtual character relative to the virtual room, and adjust the current position of the virtual character to the predetermined position according to the position difference. That is, obtain first relative position of the current position of the current spatial attribute relative to a first reference position, offset the first reference position to a second reference position in an opposite direction of a direction of the current position relative to the first reference position by the position difference indicated by the first relative position, and update the current position of the virtual character to coordinates of the predetermined position according to coordinates of the second reference position and the first relative position.

Figure 8:
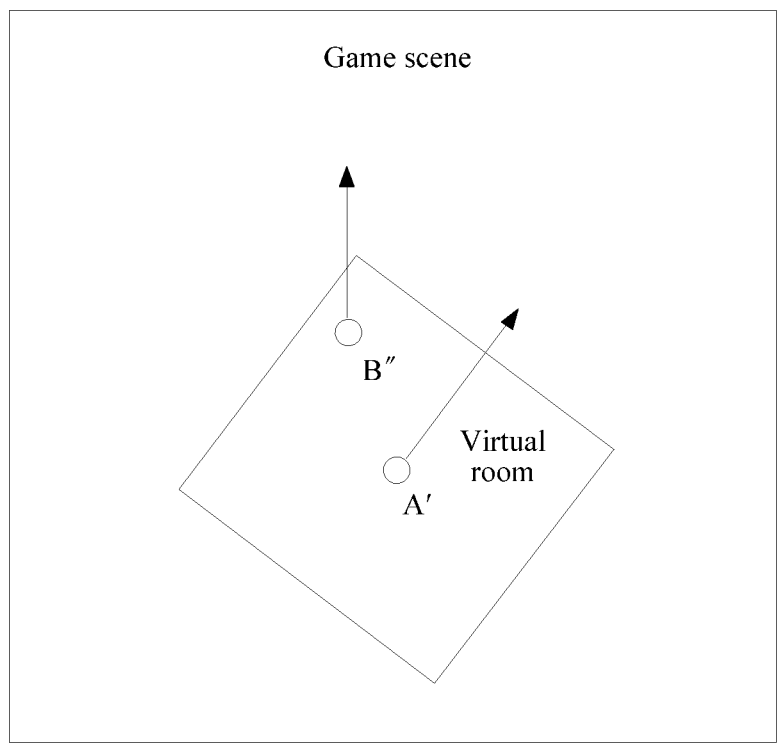
FIG. 8 is a schematic diagram of adjusting a position of a virtual character according to an embodiment of the present disclosure.

FIG. 8 is a schematic diagram of adjusting a position of a virtual character according to an embodiment of the present disclosure. As shown in FIG. 8, after the current orientation of the virtual character coincides with the target orientation, position difference between the point B' and the point A shown in FIG. 7 are obtained, and A is moved by the position difference toward an opposite orientation. The point B' is changed to a point B". That is, a position of the point B" coincides with a position of the point A in FIG. 6, an orientation of the point B" coincides with an orientation of the point A in FIG. 6, and the point A in FIG. 6 and FIG. 7 is changed to a point A' in FIG. 8.

Optionally, the process of determining the spatial attribute of the virtual character may be completed when the VR application is started, or may be completed at any time when the position and the orientation of the user need to be set.

In this embodiment, in an HTC Vive application, coordinates of the user in the room are determined by the hardware, and the program cannot directly modify the position and the orientation of the user. Consequently, in many games, the user needs to walk to a specified position in the room to start the games. In this embodiment of the present disclosure, a method for dynamically modifying a position and an orientation of a room in a game scene is used to indirectly modify the position and the orientation of the user in the game scene. After the virtual character enters the game, stable coordinate information is obtained, then differences between the coordinates and the orientation of the user in the scene and coordinates and an orientation that are set in the game are calculated, and then coordinates of the room in the game are rotated and moved according to the differences, to initialize the position and the orientation of the user. Regardless of a relative position of the user in the room, the position and the orientation of the user in the game scene are set to a position and an orientation that are preset in the game. This achieves an effect of improving flexibility in determining the spatial attribute of the virtual character, and enables the user to use software immediately when entering the software, thereby improving an experience effect of the user on the VR application.

It should be noted that for each of the foregoing method embodiments, for ease of description, the method embodiments are all described as a series of action combinations. However, a person skilled in the art should learn that the present disclosure is not limited to an order of described actions because according to the present disclosure, some steps may use another order or may be performed at the same time. In addition, a person skilled in the art should also know that all the embodiments described in this specification are preferred embodiments, and the related actions and modules are not necessarily required in the present disclosure.

Through the foregoing description of the implementations, it is clear to a person skilled in the art that the method according to the foregoing embodiment may be implemented by software plus a necessary universal hardware platform, and certainly may also be implemented by hardware, but in many cases, the software implementation is preferred. Based on such an understanding, the technical solutions of the present disclosure or the part that makes contributions to the existing technology may be substantially embodied in the form of a software product. The computer software product is stored in a storage medium (for example, a read-only memory (ROM)/random access memory (RAM), a magnetic disk, or an optical disc), and contains several instructions for instructing a terminal device (which may be a mobile phone, a computer, a server, or a network device) to perform the method according to the embodiments of the present disclosure.

According to another aspect of the embodiments of the present disclosure, an apparatus for performing the foregoing spatial attribute determination and adjustment method for a virtual character is further provided. The apparatus includes one or more processors and one or more memories storing a program unit, the program unit being executed by the processor, and the program unit including a first obtaining unit, a second obtaining unit, an adjustment unit, and an update unit.

Figure 9:
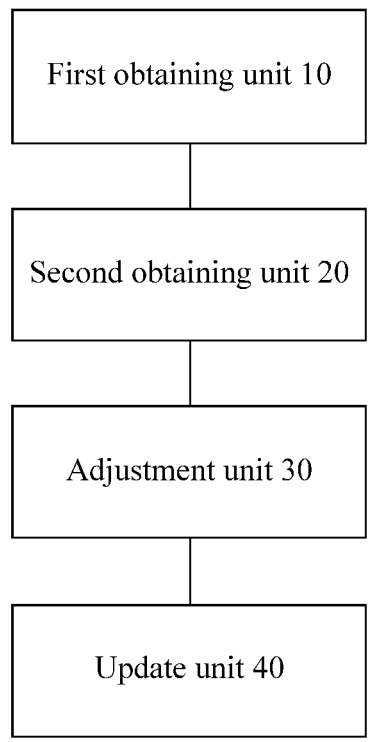
FIG. 9 is a schematic diagram of a spatial attribute determining apparatus for a virtual character according to an embodiment of the present disclosure.

FIG. 9 is a schematic diagram of a spatial attribute determining apparatus for a virtual character according to an embodiment of the present disclosure. As shown in FIG. 9, the spatial attribute determining apparatus for a virtual character may include a first obtaining unit 10, a second obtaining unit 20, an adjustment unit 30, and an update unit 40.

The first obtaining unit 10 is configured to obtain a first reference spatial attribute of a virtual character in a preset virtual scene, the first reference spatial attribute coinciding with a predetermined spatial attribute to be reached by the virtual character.

The second obtaining unit 20 is configured to obtain a first relative spatial attribute of a current spatial attribute of the virtual character relative to the first reference spatial attribute.

The adjustment unit 30 is configured to adjust the first reference spatial attribute to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute.

The update unit 40 is configured to update the current spatial attribute of the virtual character to the predetermined spatial attribute according to the second reference spatial attribute and the first relative spatial attribute.

It should be noted herein that, the first obtaining unit 10, the second obtaining unit 20, the adjustment unit 30, and the update unit 40 may be used as a part of the apparatus running in a VR helmet, and a processor in the VR helmet may be used for performing the functions implemented by the foregoing units.

Optionally, the first obtaining unit 10 includes: a first obtaining module, configured to obtain, when a current position of the current spatial attribute coincides with a predetermined position of the predetermined spatial attribute, a first reference orientation of the first reference spatial attribute, the first reference orientation coinciding with a predetermined orientation of the predetermined spatial attribute.

It should be noted herein that, the first obtaining module may be used as a part of the apparatus running in a VR helmet, and a processor in the VR helmet may be used for performing the function implemented by the foregoing module.

Optionally, the second obtaining unit 20 is configured to perform the following step to obtain the first relative spatial attribute of the current spatial attribute of the virtual character relative to the first reference spatial attribute: obtaining a first relative angle of a current orientation of the current spatial attribute relative to the first reference orientation.

Optionally, the adjustment unit 30 is configured to perform the following step to adjust the first reference spatial attribute to the second reference spatial attribute according to the first relative spatial attribute: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle.

Optionally, the adjustment unit 30 includes a first determining module and a rotation module. The first determining module is configured to determine that a direction of the current orientation relative to the first reference orientation is an angle direction indicated by the first relative angle. The rotation module is configured to rotate the first reference orientation to the second reference orientation in an opposite direction of the angle direction by an angle difference indicated by the first relative angle.

It should be noted herein that, the first determining module and the rotation module may be used as a part of the apparatus running in a VR helmet, and a processor in the VR helmet may be used for performing the functions implemented by the foregoing modules.

Optionally, the update unit 40 is configured to perform the following step to update the current spatial attribute of the virtual character to the predetermined spatial attribute according to the second reference spatial attribute and the first relative spatial attribute: updating the current orientation of the virtual character to the predetermined orientation according to the second reference orientation and the first relative angle.

The first obtaining unit 10 includes: a second obtaining module, configured to obtain, when a current orientation of the current spatial attribute coincides with a predetermined orientation of the predetermined spatial attribute, a first reference position of the first reference spatial attribute, the first reference position coinciding with a predetermined position of the predetermined spatial attribute.

It should be noted herein that, the second obtaining module may be used as a part of the apparatus running in a VR helmet, and a processor in the VR helmet may be used for performing the function implemented by the foregoing module.

The second obtaining unit 20 is configured to perform the following step to obtain the first relative spatial attribute of the current spatial attribute of the virtual character relative to the first reference spatial attribute: obtaining first relative position of a current position of the current spatial attribute relative to the first reference position.

The adjustment unit 30 is configured to perform the following step to adjust the first reference spatial attribute to the second reference spatial attribute according to the first relative spatial attribute: adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being first relative position, and the first relative spatial attribute including the first relative position.

Optionally, the adjustment unit 30 includes a second determining module and an offset module. The second determining module is configured to determine that a direction of the current position relative to the first reference position is a coordinate direction indicated by the first relative position. The offset module is configured to offset the first reference position to the second reference position in an opposite direction of the coordinate direction by position difference indicated by the first relative position.

It should be noted herein that, the second determining module and the offset module may be used as a part of the apparatus running in a VR helmet, and a processor in the VR helmet may be used for performing the functions implemented by the foregoing modules.

Optionally, the update unit 40 is configured to perform the following step to update the current spatial attribute of the virtual character to the predetermined spatial attribute according to the second reference spatial attribute and the first relative spatial attribute: updating the current position of the virtual character to the predetermined position according to the second reference position and the first relative position.

Optionally, the first obtaining unit 10 includes: a third obtaining module, configured to obtain the first reference orientation and the first reference position that are of the first reference spatial attribute, when the current position of the current spatial attribute does not coincide with the predetermined position of the predetermined spatial attribute and the current orientation of the current spatial attribute does not coincide with a target orientation of the predetermined spatial attribute, the first reference orientation coinciding with the predetermined orientation of the predetermined spatial attribute, and the first reference position coinciding with the predetermined position of the predetermined spatial attribute.

It should be noted herein that, the third obtaining module may be used as a part of the apparatus running in a VR helmet, and a processor in the VR helmet may be used for performing the function implemented by the foregoing module.

Optionally, the second obtaining unit 20 is configured to perform the following steps to obtain the first relative spatial attribute of the current spatial attribute of the virtual character relative to the first reference spatial attribute: obtaining the first relative angle of the current orientation of the current spatial attribute relative to the first reference orientation; and obtaining the first relative position of the current position of the current spatial attribute relative to the first reference position.

Optionally, the adjustment unit 30 is configured to perform the following step to adjust the first reference spatial attribute to the second reference spatial attribute according to the first relative spatial attribute: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle. The update unit 40 is configured to perform the following step to update the current spatial attribute of the virtual character to the predetermined spatial attribute according to the second reference spatial attribute and the first relative spatial attribute: updating the current orientation of the virtual character to the predetermined orientation according to the second reference orientation and the first relative angle.

Optionally, the adjustment unit 30 is further configured to: after updating the current orientation of the virtual character to the predetermined orientation according to the second reference orientation, adjust, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being first relative position, and the first relative spatial attribute including the first relative position. The update unit 40 is configured to update coordinates of the current position of the virtual character to the predetermined position according to the second reference position and the first relative position.

Optionally, the spatial attribute determining apparatus for a virtual character may further include: a control unit, configured to: after updating the current spatial attribute of the virtual character to the predetermined spatial attribute according to the second reference spatial attribute, control the virtual character to execute a preset event in a virtual application.

It should be noted herein that, the control unit may be used as a part of the apparatus running in a VR helmet, and a processor in the VR helmet may be used for performing the function implemented by the foregoing unit.

Optionally, the virtual application is a VR application.

It should be noted that, the first obtaining unit 10 in this embodiment may be configured to perform step S202 in this embodiment of this application, the second obtaining unit 20 in this embodiment may be configured to perform step S204 in this embodiment of this application, the adjustment unit 30 in this embodiment may be configured to perform step S206 in this embodiment of this application, and the update unit 40 in this embodiment may be configured to perform step S208 in this embodiment of this application.

It should be noted herein that, examples and application scenarios implemented by the foregoing units and modules and the corresponding steps are the same, but are not limited to the content disclosed in the foregoing embodiments. It should be noted that, the foregoing modules may run, as a part of the apparatus, in a hardware environment shown in FIG. 1, and may be implemented by using software, or may be implement by using hardware. The hardware environment includes a network environment.

In this embodiment, the first obtaining unit 10 obtains the first reference spatial attribute of the virtual character in the preset virtual scene, the first reference spatial attribute coinciding with the predetermined spatial attribute to be reached by the virtual character; the second obtaining unit 20 obtains the first relative spatial attribute of the current spatial attribute of the virtual character relative to the first reference spatial attribute; the adjustment unit 30 adjusts the first reference spatial attribute to the second reference spatial attribute according to the first relative spatial attribute, the relative spatial attribute of the predetermined spatial attribute relative to the second reference spatial attribute being the first relative spatial attribute, the current spatial attribute being updated as the first reference spatial attribute is adjusted, and the relative spatial attribute between the updated current spatial attribute and the adjusted first reference spatial attribute being the first relative spatial attribute; and the update unit 40 updates the current spatial attribute of the virtual character to the predetermined spatial attribute according to the second reference spatial attribute and the first relative spatial attribute. This can resolve the technical problem of low flexibility in determining a spatial attribute of a virtual character in the related technology, thereby achieving a technical effect of flexibly determining the spatial attribute of the virtual character.

According to still another aspect of the embodiments of the present disclosure, an electronic apparatus for implementing the foregoing spatial attribute determination and adjustment method for a virtual character is further provided.

Figure 10:
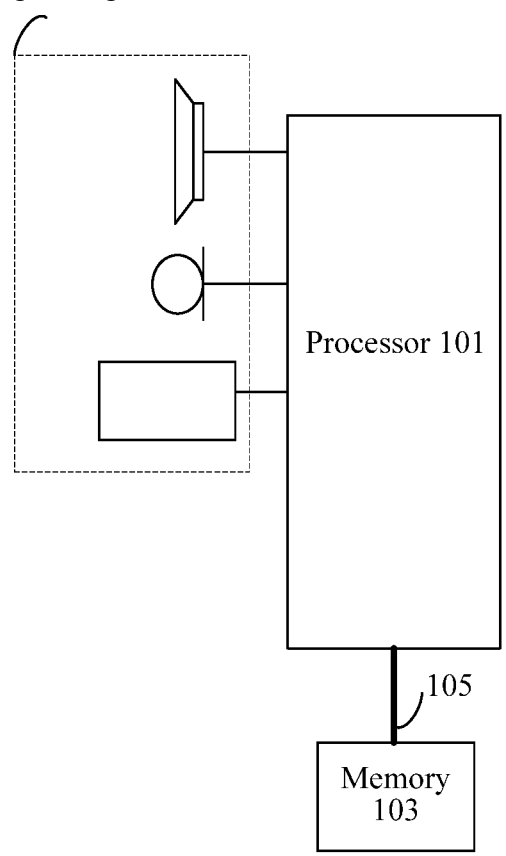
FIG. 10 is a structural block diagram of an electronic apparatus according to an embodiment of the present disclosure.

FIG. 10 is a structural block diagram of an electronic apparatus according to an embodiment of the present disclosure. As shown in FIG. 10, the electronic apparatus may include one or more processors 101 (where only one processor is shown in the figure) and a memory 103. The memory 103 may store a computer program. The processor 101 may be configured to run the computer program to perform the spatial attribute determination and adjustment method for a virtual character in the embodiments of the present disclosure.

The memory 103 may be configured to store the computer program and a module, for example, a program instruction/module corresponding to the spatial attribute determination and adjustment method and apparatus for a virtual character in the embodiments of the present disclosure. The processor 101 is configured to run a software program and a module that are stored in the memory 103 to execute various functional applications and perform data processing, that is, implement the foregoing spatial attribute determination and adjustment method for a virtual character. The memory 103 may include a high-speed random memory, and may also include a non-volatile memory such as one or more magnetic storage devices, a flash memory, or another non-volatile solid-state memory. In some examples, the memory 103 may further include a memory remotely disposed relative to the processor 101. Examples of the network include but are not limited to the Internet, an intranet, a local area network, a mobile communications network, and a combination thereof.

Optionally, as shown in FIG. 10, the electronic apparatus may further include a transmission apparatus 105 and an input/output device 107. The transmission apparatus 105 is configured to receive or send data through a network, or may be used for data transmission between the processor and the memory. Specific examples of the foregoing network may include a wired network and a wireless network. In an example, the transmission apparatus 105 includes a network interface controller (NIC) that may be connected to another network device and a router by using a network cable, thereby communicating with the Internet or a local area network. In an example, the transmission apparatus 105 is a radio frequency (RF) module that is configured to communicate with the Internet in a wireless manner.

Specifically, the memory 103 is configured to store the computer program.

The processor 101 may invoke, by using the transmission apparatus 105, the computer program stored in the memory 103, to perform program code of steps of the methods in optional or preferred embodiments in the foregoing method embodiments, including:

obtaining a first reference spatial attribute of a virtual character in a preset virtual scene, the first reference spatial attribute coinciding with a predetermined spatial attribute to be reached by the virtual character;

obtaining a first relative spatial attribute of a current spatial attribute of the virtual character relative to the first reference spatial attribute;

adjusting the first reference spatial attribute to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and updating the current spatial attribute of the virtual character to the predetermined spatial attribute according to the second reference spatial attribute and the first relative spatial attribute.

The processor 101 is further configured to perform the following step: obtaining, when a current position of the current spatial attribute coincides with a predetermined position of the predetermined spatial attribute, a first reference orientation of the first reference spatial attribute, the first reference orientation coinciding with a predetermined orientation of the predetermined spatial attribute.

The processor 101 is further configured to perform the following step: adjusting, according to a first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle.

The processor 101 is further configured to perform the following steps: determining that a direction of the current orientation relative to the first reference orientation is an angle direction indicated by the first relative angle; and rotating the first reference orientation to the second reference orientation in an opposite direction of the angle direction by an angle difference indicated by the first relative angle.

The processor 101 is further configured to perform the following step: updating the current orientation of the virtual character to the predetermined orientation according to the second reference orientation and the first relative angle.

The processor 101 is further configured to perform the following step: obtaining, when the current orientation of the current spatial attribute coincides with the predetermined orientation of the predetermined spatial attribute, a first reference position of the first reference spatial attribute, the first reference position coinciding with the predetermined position of the predetermined spatial attribute.

The processor 101 is further configured to perform the following step: obtaining first relative position of the current position of the current spatial attribute relative to the first reference position.

The processor 101 is further configured to perform the following step: adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being first relative position, and the first relative spatial attribute including the first relative position.

The processor 101 is further configured to perform the following steps: determining that a direction of the current position relative to the first reference position is a coordinate direction indicated by the first relative position; and offsetting the first reference position to the second reference position in an opposite direction of the coordinate direction by position difference indicated by the first relative position.

The processor 101 is further configured to perform the following step: updating the current position of the virtual character to the predetermined position according to the second reference position and the first relative position.

The processor 101 is further configured to perform the following step: obtaining the first reference orientation and the first reference position that are of the first reference spatial attribute, when the current position of the current spatial attribute does not coincide with the predetermined position of the predetermined spatial attribute and the current orientation of the current spatial attribute does not coincide with a target orientation of the predetermined spatial attribute, the first reference orientation coinciding with the predetermined orientation of the predetermined spatial attribute, and the first reference position coinciding with the predetermined position of the predetermined spatial attribute.

The processor 101 is further configured to perform the following steps: obtaining the first relative angle of the current orientation of the current spatial attribute relative to the first reference orientation; and obtaining the first relative position of the current position of the current spatial attribute relative to the first reference position.

The processor 101 is further configured to perform the following steps: adjusting, according to the first relative angle, the first reference orientation to the second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle; and updating the current orientation of the virtual character to the predetermined orientation according to the second reference orientation and the first relative angle.

The processor 101 is further configured to perform the following step: after updating the current orientation of the virtual character to the predetermined orientation according to the second reference orientation, adjusting, according to the first relative position, the first reference position to the second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being the first relative position, and the first relative spatial attribute including the first relative position; and updating the current position of the virtual character to the predetermined position according to the second reference position and the first relative position.

The processor 101 is further configured to perform the following step: after updating the current spatial attribute of the virtual character to the predetermined spatial attribute according to the second reference spatial attribute, controlling the virtual character to execute a preset event in a virtual application.

According to this embodiment of the present disclosure, a solution of a spatial attribute determination and adjustment method for a virtual character is provided. A predetermined spatial attribute of a virtual character in a preset virtual scene of a virtual application is obtained; a reference spatial attribute of a reference object is set to the predetermined spatial attribute, the reference spatial attribute being used for indicating a spatial attribute of the reference object in the preset virtual scene; a spatial attribute difference between a current spatial attribute of the virtual character and the reference spatial attribute is obtained, the current spatial attribute being used for indicating a spatial attribute of the virtual character in the preset virtual scene currently; the reference spatial attribute of the reference object is adjusted in the preset virtual scene according to the spatial attribute difference if a relative spatial attribute between the reference object and the virtual character remains unchanged, to make the current spatial attribute coincide with the predetermined spatial attribute, to adjust a position of the virtual character in the preset virtual scene, thereby achieving a technical effect of flexibly determining a spatial attribute of the virtual character, and resolving the technical problem of low flexibility in determining the spatial attribute of the virtual character in the related technology.

Optionally, for a specific example in this embodiment, refer to the examples described in the foregoing embodiments. Details are not described herein again in this embodiment.

A person of ordinary skill in the art can understand that the structure shown in FIG. 10 is merely exemplary, and the electronic apparatus may be a VR helmet. FIG. 10 does not limit the structure of the foregoing electronic apparatus. For example, the electronic apparatus may further include more or fewer components (such as a network interface and a display apparatus) than those shown in FIG. 10, or have a configuration different from that shown in FIG. 10.

A person of ordinary skill in the art may understand that all or some of the steps in the methods of the foregoing embodiments may be implemented by a program instructing relevant hardware of the terminal device. The program may be stored in a computer readable storage medium. The storage medium may be a flash disk, a ROM, a RAM, a magnetic disk, or an optical disc.

An embodiment of the present disclosure further provides a storage medium. Optionally, in this embodiment, the storage medium stores a computer program. The computer program may be configured to perform, during running, the steps in the spatial attribute determination and adjustment method for a virtual character in the foregoing method embodiments.

Optionally, in this embodiment, the storage medium may be located in any computer terminal in a computer terminal cluster in a computer network shown in the foregoing embodiment, or may be located in any mobile terminal in a mobile terminal cluster.

Optionally, in this embodiment, the storage medium is configured to store program code for performing the following steps:

obtaining a first reference spatial attribute of a virtual character in a preset virtual scene, the first reference spatial attribute coinciding with a predetermined spatial attribute to be reached by the virtual character;

obtaining a first relative spatial attribute of a current spatial attribute of the virtual character relative to the first reference spatial attribute;

adjusting the first reference spatial attribute to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and updating the current spatial attribute of the virtual character to the predetermined spatial attribute according to the second reference spatial attribute and the first relative spatial attribute.

Optionally, the storage medium is further configured to store program code for performing the following step: obtaining, when a current position of the current spatial attribute coincides with a predetermined position of the predetermined spatial attribute, a first reference orientation of the first reference spatial attribute, the first reference orientation coinciding with a predetermined orientation of the predetermined spatial attribute.

Optionally, the storage medium is further configured to store program code for performing the following step: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle.

Optionally, the storage medium is further configured to store program code for performing the following steps: determining that a direction of the current orientation relative to the first reference orientation is an angle direction indicated by the first relative angle; and rotating the first reference orientation to the second reference orientation in an opposite direction of the angle direction by an angle difference indicated by the first relative angle.

Optionally, the storage medium is further configured to store program code for performing the following step: updating the current orientation of the virtual character to the predetermined orientation according to the second reference orientation and the first relative angle.

Optionally, the storage medium is further configured to store program code for performing the following step: obtaining, when a current orientation of the current spatial attribute coincides with a predetermined orientation of the predetermined spatial attribute, a first reference position of the first reference spatial attribute, the first reference position coinciding with a predetermined position of the predetermined spatial attribute.

Optionally, the storage medium is further configured to store program code for performing the following step: obtaining first relative position of a current position of the current spatial attribute relative to the first reference position.

Optionally, the storage medium is further configured to store program code for performing the following step: adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being first relative position, and the first relative spatial attribute including the first relative position.

Optionally, the storage medium is further configured to store program code for performing the following steps: determining that a direction of the current position relative to the first reference position is a coordinate direction indicated by the first relative position; and offsetting the first reference position to the second reference position in an opposite direction of the coordinate direction by position difference indicated by the first relative position.

Optionally, the storage medium is further configured to store program code for performing the following step: updating coordinates of the current position of the virtual character to the predetermined position according to the second reference position and the first relative position.

Optionally, the storage medium is further configured to store program code for performing the following step: obtaining a first reference orientation and a first reference position that are of the first reference spatial attribute, when a current position of the current spatial attribute does not coincide with a predetermined position of the predetermined spatial attribute and a current orientation of the current spatial attribute does not coincide with a target orientation of the predetermined spatial attribute, the first reference orientation coinciding with a predetermined orientation of the predetermined spatial attribute, and the first reference position coinciding with the predetermined position of the predetermined spatial attribute.

Optionally, the storage medium is further configured to store program code for performing the following steps: obtaining a first relative angle of the current orientation of the current spatial attribute relative to the first reference orientation; and obtaining first relative position of the current position of the current spatial attribute relative to the first reference position.

Optionally, the storage medium is further configured to store program code for performing the following steps: adjusting, according to the first relative angle, the first reference orientation to a second reference orientation of the second reference spatial attribute, a relative angle of the predetermined orientation relative to the second reference orientation being the first relative angle, the current orientation being updated as the first reference orientation is adjusted, a relative angle between the updated current orientation and the adjusted first reference orientation being the first relative angle, and the first relative spatial attribute including the first relative angle; and updating the current orientation of the virtual character to the predetermined orientation according to the second reference orientation and the first relative angle.

Optionally, the storage medium is further configured to store program code for performing the following steps: after updating the current orientation of the virtual character to the predetermined orientation according to the second reference orientation, adjusting, according to the first relative position, the first reference position to a second reference position of the second reference spatial attribute, relative position of the predetermined position relative to the second reference position being the first relative position, the current position being updated as the first reference position are adjusted, relative position between the updated coordinates of the current position and the adjusted coordinates of the first reference position being the first relative position, and the first relative spatial attribute including the first relative position; and updating the current position of the virtual character to the predetermined position according to the second reference position and the first relative position.

Optionally, the storage medium is further configured to store program code for performing the following step: after updating the current spatial attribute of the virtual character to the predetermined spatial attribute according to the second reference spatial attribute, controlling the virtual character to execute a preset event in a virtual application.

Optionally, for a specific example in this embodiment, refer to the examples described in the foregoing embodiments. Details are not described herein again in this embodiment.

Optionally, in this embodiment, the foregoing storage medium may include but is not limited to: any medium that can store program code, such as a USB flash drive, a ROM, a RAM, a removable hard disk, a magnetic disk, or an optical disc.

The spatial attribute determination and adjustment method and apparatus for a virtual character, and the storage medium according to the present disclosure are described above with reference to the accompanying drawings by way of example. However, a person skilled in the art should understand that various improvements can further be made to the spatial attribute determination and adjustment method and apparatus for a virtual character, and the storage medium provided in the present disclosure without departing from the content of the present disclosure. Therefore, the protection scope of the present disclosure should be determined based on content of the appended claims.

The sequence numbers of the foregoing embodiments of the present disclosure are merely for description purpose but do not indicate the preference of the embodiments.

When the integrated unit in the foregoing embodiment is implemented in a form of a software functional unit and sold or used as an independent product, the integrated unit may be stored in the foregoing computer-readable storage medium. Based on such an understanding, the technical solutions of the present disclosure essentially, or the part contributing to the existing technology, or all or some of the technical solutions may be represented in a form of a software product. The computer software product is stored in a storage medium and includes several instructions for instructing one or more computer devices (which may be a personal computer, a server, or a network device) to perform all or some of the steps of the methods in the embodiments of the present disclosure.

In the foregoing embodiments of the present disclosure, the descriptions of the embodiments have respective focuses. For a part not described in detail in an embodiment, refer to a related description of another embodiment.

In the several embodiments provided in this application, it should be understood that the disclosed client may be implemented in other manners. The described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the units or modules may be implemented in electrical or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

The foregoing descriptions are merely exemplary implementations of the present disclosure. It should be noted that a person of ordinary skill in the art may make several improvements or polishing without departing from the principle of the present disclosure, and the improvements or polishing shall also fall within the protection scope of the present disclosure.

INDUSTRIAL PRACTICABILITY

A first reference spatial attribute of a virtual character is obtained in a preset virtual scene, the first reference spatial attribute coinciding with a predetermined spatial attribute to be reached by the virtual character; a first relative spatial attribute of a current spatial attribute of the virtual character relative to the first reference spatial attribute is obtained; the first reference spatial attribute is adjusted to a second reference spatial attribute according to the first relative spatial attribute, a relative spatial attribute of the predetermined spatial attribute relative to the second reference spatial attribute being the first relative spatial attribute, the current spatial attribute being updated as the first reference spatial attribute is adjusted, and a relative spatial attribute between the updated current spatial attribute and the adjusted first reference spatial attribute being the first relative spatial attribute; and the current spatial attribute of the virtual character is updated to the predetermined spatial attribute according to the second reference spatial attribute and the first relative spatial attribute, to adjust a position of the virtual character in the preset virtual scene, thereby achieving a technical effect of flexibly determining a spatial attribute of the virtual character, and resolving the technical problem of low flexibility in determining the spatial attribute of the virtual character in the related technology.

What is claimed is:

1. A method for automatically adjusting spatial attribute of a virtual character in a preset virtual scene by an electronic device running a virtual application, comprising:
   initializing a first reference spatial attribute of the virtual character in the preset virtual scene using a predetermined spatial attribute in the preset virtual scene, wherein:
      the predetermined spatial attribute represents a triggering spatial attribute where the electronic device automatically triggers a predetermined event in the virtual application when a current spatial attribute of the virtual character coincides with the predetermined spatial attribute; and
      a spatial attribute comprises a position and an orientation relative to the virtual scene;
   obtaining the current spatial attribute of the virtual character in the preset virtual scene based on a sensor output from the electronic device;
   obtaining a first relative spatial attribute of the current spatial attribute of the virtual character relative to the first reference spatial attribute;
   automatically adjusting the first reference spatial attribute to a second reference spatial attribute in the virtual scene according to the first relative spatial attribute, wherein:
      a relative spatial attribute of the predetermined spatial attribute relative to the second reference spatial attribute is maintained at the first relative spatial attribute; and
      the current spatial attribute of the virtual character is updated as the first reference spatial attribute is adjusted, and a relative spatial attribute between the updated current spatial attribute of the virtual character and the adjusted first reference spatial attribute is maintained at the first relative spatial attribute; and
   updating the current spatial attribute of the virtual character to the predetermined spatial attribute according to the second reference spatial attribute and the first relative spatial attribute.

2. The method according to claim 1, wherein initializing the first reference spatial attribute comprises:
   obtaining, when a current position of the current spatial attribute coincides with a predetermined position of the predetermined spatial attribute, a predetermined orientation of the predetermined spatial attribute;
   initializing a first reference position of the first reference spatial attribute to the current position; and
   initializing a first reference orientation of the first reference spatial attribute to the predetermined orientation.

3. The method according to claim 2, wherein obtaining the first relative spatial attribute comprises:
   obtaining a first relative angle of a current orientation of the current spatial attribute relative to the first reference orientation.

4. The method according to claim 3, wherein automatically adjusting the first reference spatial attribute to the second reference spatial attribute according to the first relative spatial attribute comprises:
   adjusting, according to the first relative angle, the first reference orientation to a second reference orientation of the second reference spatial attribute, wherein a relative angle of the predetermined orientation relative to the second reference orientation is maintained at the first relative angle, wherein the current orientation is updated as the first reference orientation is adjusted, and wherein a relative angle between the updated current orientation and the adjusted first reference orientation is maintained at the first relative angle.

5. The method according to claim 4, wherein adjusting, according to the first relative angle, the first reference orientation to the second reference orientation of the second reference spatial attribute comprises:
determining a direction of the first relative angle; and
rotating the first reference orientation to the second reference orientation in an opposite direction of the direction of the first relative angle and by an angular amount of the first relative angle.

6. The method according to claim 4, wherein updating the current spatial attribute of the virtual character to the predetermined spatial attribute according to the second reference spatial attribute and the first relative spatial attribute comprises:
updating the current orientation of the virtual character to the predetermined orientation according to the second reference orientation and the first relative angle.

7. The method according to claim 1, wherein initiating a first reference spatial attribute of the virtual character comprises:
obtaining, when a current orientation of the current spatial attribute coincides with a predetermined orientation of the predetermined spatial attribute, a predetermined position of the predetermined spatial attribute;
initializing a first reference position of the first reference spatial attribute to the predetermined position; and
initializing a first reference orientation of the first reference spatial attribute to the current orientation.

8. The method according to claim 7, wherein the obtaining a first relative spatial attribute comprises:
obtaining a first relative position of a current position of the current spatial attribute relative to the first reference position.

9. The method according to claim 8, wherein automatically adjusting the first reference spatial attribute to a second reference spatial attribute according to the first relative spatial attribute comprises:
adjusting, according to the first relative position, the first reference position to a second reference position of the second reference spatial attribute, wherein a relative position of the predetermined position relative to the second reference position is maintained at the first relative position, wherein the current position is updated as the first reference position is adjusted, and wherein a relative position between the updated current position and the adjusted first reference position is maintained at the first relative position.

10. The method according to claim 9, wherein adjusting, according to the first relative position, the first reference position to the second reference position of the second reference spatial attribute comprises:
determining a direction of the first relative position; and
offsetting the first reference position to the second reference position in an opposite direction of the direction of the first relative position and by an positional amount of the first relative position.

11. The method according to claim 9, wherein the updating the current spatial attribute of the virtual character to the predetermined spatial attribute according to the second reference spatial attribute and the first relative spatial attribute comprises:
updating the current position of the virtual character to the predetermined position according to the second reference position and the first relative position.

12. The method according to claim 1, wherein initiating a first reference spatial attribute comprises:
obtaining a first reference orientation and a first reference position of the first reference spatial attribute, when a current position of the current spatial attribute does not coincide with a predetermined position of the predetermined spatial attribute and a current orientation of the current spatial attribute does not coincide with a predetermined orientation of the predetermined spatial attribute, the predetermined orientation and the predetermined position;
initializing a first reference position of the first reference spatial attribute to the predetermined position; and
initializing a first reference orientation of the first reference spatial attribute to the predetermined orientation.

13. The method according to claim 12, wherein obtaining the first relative spatial attribute comprises:
obtaining a first relative angle of the current orientation of the current spatial attribute relative to the first reference orientation; and
obtaining a first relative position of the current position of the current spatial attribute relative to the first reference position.

14. The method according to claim 13, wherein
automatically adjusting the first reference spatial attribute to the second reference spatial attribute according to the first relative spatial attribute comprises:
adjusting, according to the first relative angle, the first reference orientation to a second reference orientation of the second reference spatial attribute, wherein a relative angle of the predetermined orientation relative to the second reference orientation is maintained at the first relative angle, wherein the current orientation is updated as the first reference orientation is adjusted, and wherein a relative angle between the updated current orientation and the adjusted first reference orientation is maintained at the first relative angle; and
updating the current spatial attribute of the virtual character to the predetermined spatial attribute according to the second reference spatial attribute and the first relative spatial attribute comprises:
updating the current orientation of the virtual character to the predetermined orientation according to the second reference orientation and the first relative angle.

15. The method according to claim 14, wherein:
automatically adjusting the first reference spatial attribute to the second reference spatial attribute according to the first relative spatial attribute further comprises,
adjusting, according to the first relative position, the first reference position to a second reference position of the second reference spatial attribute, wherein a relative position of the predetermined position relative to the second reference position is maintained at the first relative position, wherein the current position is updated as the first reference position is adjusted, and wherein a relative position between the updated current position and the adjusted first reference position is maintained at the first relative position; and
updating the current spatial attribute of the virtual character to the predetermined spatial attribute according to the second reference spatial attribute and the relative spatial attribute further comprises:

updating the current position of the virtual character to the predetermined position according to the second reference position and the first relative position.

16. The method according to claim 1, wherein after the updating the current spatial attribute of the virtual character to the predetermined spatial attribute according to the second reference spatial attribute, the method further comprises:

controlling the virtual character to automatically trigger the predetermined event in a virtual application.

17. The method according to claim 16, wherein the virtual application is a virtual reality (VR) application.

18. An electronic device for adjusting spatial attribute of a virtual character in a preset virtual scene a virtual application running in the electronic device, comprising one or more processors and one or more memories storing computer instructions being executed by the processor to cause the electronic device to:

initialize a first reference spatial attribute of the virtual character in the preset virtual scene using a predetermined spatial attribute in the preset virtual scene, wherein:

the predetermined spatial attribute represents a triggering spatial attribute where the electronic device automatically triggers a predetermined event in the virtual application when a current spatial attribute of the virtual character coincides with the predetermined spatial attribute; and a spatial attribute comprises a position and an orientation relative to the virtual scene;

obtain the current spatial attribute of the virtual character in the preset virtual scene based on a sensor output from the electronic device;

obtain a first relative spatial attribute of the current spatial attribute of the virtual character relative to the first reference spatial attribute;

automatically adjust the first reference spatial attribute to a second reference spatial attribute in the virtual scene according to the first relative spatial attribute and without user action, wherein:

a relative spatial attribute of the predetermined spatial attribute relative to the second reference spatial attribute is maintained at the first relative spatial attribute; and the current spatial attribute of the virtual character is updated as the first reference spatial attribute is adjusted, and a relative spatial attribute between the updated current spatial attribute of the virtual character and the adjusted first reference spatial attribute is maintained at the first relative spatial attribute; and update the current spatial attribute of the virtual character to the predetermined spatial attribute according to the second reference spatial attribute and the first relative spatial attribute.

19. The electronic device according to claim 18, wherein the computer instructions, when executed by the one or more processors to cause the electronic device to initialize the first reference spatial attribute, cause the electronic device to:

obtain, when a current position of the current spatial attribute coincides with a predetermined position of the predetermined spatial attribute, a predetermined orientation of the predetermined spatial attribute;

initialize a first reference position of the first reference spatial attribute to the current position; and initialize a first reference orientation of the first reference spatial attribute to the predetermined orientation.

20. The electronic device according to claim 18, wherein the computer instructions, when executed by the one or more processors to cause the electronic device to initialize the first reference spatial attribute, cause the electronic device to:

obtain, when a current orientation of the current spatial attribute coincides with a predetermined orientation of the predetermined spatial attribute, a predetermined position of the predetermined spatial attribute;

initialize a first reference position of the first reference spatial attribute to the predetermined position; and initialize a first reference orientation of the first reference spatial attribute to the current orientation.

* * * * *